United States Patent [19]

Kratel et al.

[11] 4,427,356
[45] Jan. 24, 1984

[54] BONDABLE INSULATING PLATE

[75] Inventors: Gunter Kratel, Durach-Bechen; Hans Katzer; Hans-Peter Kalmuk, both of Kempten, all of Fed. Rep. of Germany

[73] Assignee: Wacker Chemie GmbH, Kempten, Fed. Rep. of Germany

[21] Appl. No.: 292,684

[22] Filed: Aug. 13, 1981

[30] Foreign Application Priority Data

Sep. 26, 1980 [DE] Fed. Rep. of Germany ....... 3036422

[51] Int. Cl.$^3$ .............................................. B32B 3/00
[52] U.S. Cl. ................................... 428/195; 428/688; 428/920
[58] Field of Search ............... 428/195, 200, 288, 701, 428/702, 920, 688

[56] References Cited

U.S. PATENT DOCUMENTS 4,250,220  2/1981  Schlatter et al. ................... 428/920

Primary Examiner—Marion McCamish
Assistant Examiner—Beverly K. Johnson
Attorney, Agent, or Firm—Burgess, Ryan & Wayne

[57] ABSTRACT

The invention is an insulating plate capable of being bonded to a substrate comprising a highly disperse inorganic heat-insulating material and a binder, the binder being inhomogeneously distributed in such a manner that in the region near the bonding surface, the content of binder is from 3 to 15% by weight, and, in the remaining region, it is from about 0 to 1.5% by weight. The plate according to the invention may be in the form of a cooking plate.

6 Claims, 1 Drawing Figure

BONDABLE INSULATING PLATE

The invention relates to a bondable insulating plate comprising a highly disperse inorganic heat-insulating material and a binder.

BACKGROUND OF THE INVENTION

Insulating plates capable of being bonded are known. Examples of these plates are heat-insulating plates having a glass-fibre covering or an adhesive film coating. Such plates generally have good heat-insulating properties but, for many uses, they do not have sufficient thermal stability.

Ceramic plates which are capable of being bonded and are resistant to high temperatures are known. However, they generally have poor heat-insulating properties.

In general, insulating plates that are formed by pressing a highly disperse inorganic heat-insulating material without a binder have heat insulating properties similar to the properties of the heat-insulating material. In practice, however, plates of this type must be considered as not bondable since the areas of adhesion loosen under slight mechanical strain.

Shaped articles, including plates, comprising a highly disperse inorganic heat-insulating material and a binder homogeneously distributed within the article are also known. In order to provide shaped articles of this type, with a surface capable of being bonded, large quantities of binder have to be incorporated into the article. The large quantities of binder required increases the conductivity of the article and reduces the heat-insulating properties to unacceptably low levels.

The present invention provides an insulating plate which is capable of being bonded, which can withstand the strain of relatively high temperatures and which has heat insulating properties similar to binder-free heat-insulating plates.

The invention provides an insulating plate that can be used as a cooking plate, which can withstand the temperature strain of a red-hot wire heating element adhered thereto by a mechanically strong and stable bond. The insulating plate of the present invention has an overall thickness about the same as the thickness of a binder-free plate having the same insulating value.

BRIEF SUMMARY OF THE INVENTION

According to the present invention, an insulating plate is provided having an inhomogeneous distribution of binder between the major surfaces of the plate.

The insulating plate of the present invention capable of being bonded, comprises a highly disperse inorganic heat-insulating material and a binder, wherein the binder is inhomogeneously distributed, between the two major surfaces of the plate. The content of binder ranges from about 3 to 15% by weight in the region of the plate near the surface used as the contact surface for bonding, based on the composition of that region, and ranges from about 0 to 1.5% by weight in the remaining, major part of the plate, based on the composition.

DETAILED DESCRIPTION OF THE INVENTION

Figure 1:
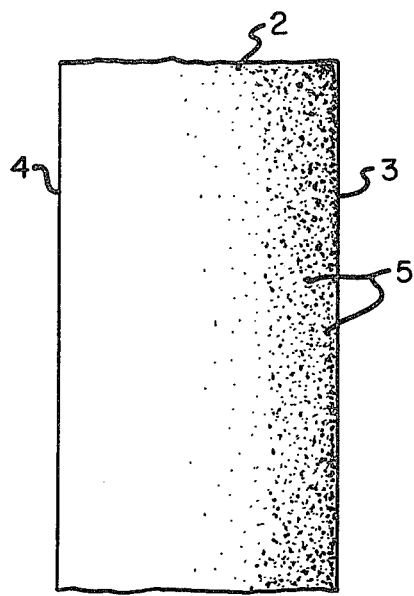
FIG. 1 is an illustration of a cross-section of a plate showing the distribution of binder.

The heat-insulating composition within the scope of the invention, for the unhardened or slightly hardened part of the plate, referred to herein as the "remaining major part of the plate", comprises
 from about 30 to 100% by weight of finely divided particulate metal oxide,
 from about 0 to 50% by weight of an opacifier,
 from about 0 to 20% by weight of fibrous material, and
 from about 0 to 1.5% by weight of a binder.

The region of the plate near the surface used as the contact surface for bonding comprises
 from about 30 to 97% by weight of a finely divided particulate metal oxide
 from about 0 to 50% by weight of an opacifier,
 from about 0 to 20% by weight of fibrous material, and
 from about 3 to 15% by weight of a binder.

Nonlimiting examples of finely divided particulate metal oxides useful in the present invention include pyrogenic silicas, including electric-arc silicas and precipitated silicas having a low alkali content, aluminium oxide, titanium dioxide, and zirconium dioxide. The finely divided particulate metal oxides have specific surface areas of from about 50 to 700 m$^2$/g, preferably from about 70 to 400 m$^2$/g.

Opacifiers suitable for use in the present invention include ilmenite, titanium dioxide, silicon carbide, iron (II)-iron (III) mixed oxide, chromium dioxide, zirconium oxide, manganese dioxide and ferric oxide. The opacifiers preferably have an absorption maximum in the infra-red range between about 1.5 and 10 μm.

Examples of fibrous materials useful in the present invention include glass wool, rock wool, slag wool, ceramic fibers obtained from melts of aluminium oxide and/or silicon oxide, asbestos fibers, and the like.

Binders useful in the present invention include, for example, borides of aluminium, titanium, zirconium and calcium; silicides such as calcium silicide and calcium-/aluminium silicide, and preferably boron carbide.

When using borides as binders, it is advantageous to include basic oxides, especially magnesium oxide, calcium oxide or barium oxide, in amounts of from about 1.5 to 10 times the weight of binder in the composition.

The compositions can be obtained by simple mixing of the components in the desired ratio. It is, however, possible to use agglomerated mixtures, especially those comprising pyrogenic silica. When agglomerated pyrogenic silica is used, the opacifier can be incorporated into the agglomerated silica, in the desired proportion, during the silica-manufacturing process while the silica is still in the form of primary particles.

The insulating plate according to the invention is manufactured by compacting and pressing at least two compositions which differ at least with respect to their content of binder.

A preferred manufacturing process comprises:
 (a) precompacting a heat-insulating first composition, which has a zero or low binder content, at pressures of from 1 to 5 kgf/cm$^2$, preferably at about 2 kgf/cm$^2$;
 (b) applying a layer of a second composition having a high binder content to at least a major surface of the precompacted first composition to form a blank;
 (c) pressing the blank to form a plate, at a final pressure of from about 10 to 15 kgf/cm$^2$, and (d) heating the pressed plate to temperatures of from about 500° to 800° C.

When compacting and pressing the first composition and the blank, the gases entraped therein must be able to escape. The compaction and pressing is therefore preferably carried out under low pressure. Degassing can alternatively take place or begin before compaction and pressing.

The binder-rich layer which acts as a contact surface for bonding can be up to about 5 mm thick but is generally about 1 mm thick. The lower limit of the thickness of the binder rich layer is controlled by the grain size of the material. Insulating plates of the invention which have an especially thin binder-rich layer can be manufactured, for example, by forming the blank by dusting the binder-rich mixture onto the surface of the pre-compacted first composition, having a zero or low binder content, and then compressing the blank.

It is often desirable to make impressions in the insulating plates, for example, for accommodating heating coils. In order to produce a binder-rich layer of uniform thickness, it is preferable to make an identical impression in the precompacted first composition, The impressions can be produced by using a press having appropriate raised portions, for compacting and pressing the heat-insulating material.

The insulating plates according to the invention are capable of being bonded. Commercial high-temperature-resistant adhesives based on water glass or phosphates are used as the adhesives. Such adhesives are usually termed ceramic adhesives.

The insulating plates according to the invention can be bonded to metals, ceramics, glass fibres, rock wool and other materials. For high-temperature use, the plates may also be provided with an aluminium silicate fibre covering. This can be effected, for example, by bonding a web or felt of the material to the surface of the plate.

The plates can be used, for example, as oven linings or as cooking plates with heating coils bonded thereto. The plates are advantageous in that heating coils can be easily bonded to the plates. The plates have good dimensional stability. Since the plates according to the invention can be readily shaped to provide well-defined edges, a close-jointed fit is ensured.

The insulating plates of the invention which are capable of being bonded have heat-insulating properties that are almost equal to those of binder-free heat-insulating plates. Accordingly, the overall insulating thicknesses which are usually required when using binder-free plates is about the same when using the insulating plates of the present invention. However, the plates according to the present invention differ from binder-free plates in their substantially increased capacity to take mechanical strain, and especially in their ability to be bonded to another article.

FIG. 1 is a cross section of a portion of a plate of the present invention. Plate 2 has a bondable major surface 3 and major surface 4. Binder particles 5 are inhomogeneously distributed over the cross section of the plate. The binder particles 5 are present in a high concentration in the region near the bondable surface and as shown, can be absent from the major remaining part of the plate near the surface opposite the bonding surface.

EXAMPLE

A plate 18 cm in diameter and 1.5 cm thick was manufactured as follows:

A mixture of
89.4 g of pyrogenic silica,
52.2 g of ilmenite, and
8.4 g of aluminium silicate fibres
was precompacted at a pressure of 2 kg/cm$^2$ to form a precompacted composition.

13 g of a mixture of
6.0 g of pyrogenic silica,
3.5 g of ilmenite,
2.0 g of aluminium silicate fibres,
0.5 g of B$_4$C, and
1 g of magnesium oxide
were applied in an even layer to the precompacted composition to form a blank.

Finally, the blank was pressed at a pressure of 12 kg/cm$^2$ to form a plate with an overall thickness of 1.5 cm.

The press had a raised portion producing a spiral impression in the plate.

The plate was then heated for one hour at 750° C. in the course of which the layer containing the binder hardened.

A heating coil was affixed to the plate with a ceramic water-glass based adhesive (trade name: Resitect 160 K, Messrs. Didier).

After a 30 hour fatigue test under the operating conditions of a cooking plate, the adhesive connection between the insulating plate and the heating coil was unimparied.

We claim:

1. A bondable insulating plate comprising dispersed inorganic heat insulating material having a specific surface of from about 50 to 700 m$^2$/g and a binder, wherein the binder is inhomogenously distributed in the inorganic heat insulating material to provide a binder-rich layer, at one surface, containing from about 3 to 15% of binder based on the weight of the binder-rich layer and from about 0 to 1.5% by weight of binder in the inorganic heat insulating material in the plate outside of the binder-rich layer.

2. An insulating plate according to claim 1 containing a basic oxide in an amount of from about 1.5 to 10 times by weight of the binder.

3. An insulating plate according to claim 1 having a heating coil bonded thereto.

4. An insulating plate according to claim 2 having a heating coil bonded thereto.

5. An insulating plate according to claim 1 having a layer of aluminum silicate fibers bonded thereto.

6. A bondable insulating plate of claim 1 wherein the inorganic heat insulating material has a specific surface of from 70 to 400 m$^2$/g.

* * * * *